(12) United States Patent
Li (10) Patent No.: US 11,307,723 B2
(45) Date of Patent: Apr. 19, 2022

(54) TOUCH PANEL (71) Applicant: WUHAN CHINA STAR OPTOELECTRONICS SEMICONDUCTOR DISPLAY TECHNOLOGY CO., LTD., Hubei (CN)

(72) Inventor: Bo Li, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 340 days.

(21) Appl. No.: 16/483,550

(22) PCT Filed: Apr. 25, 2019

(86) PCT No.: PCT/CN2019/084262
§ 371 (c)(1),
(2) Date: Aug. 5, 2019

(87) PCT Pub. No.: WO2020/177199
PCT Pub. Date: Sep. 10, 2020

(65) Prior Publication Data
US 2021/0333941 A1   Oct. 28, 2021

(30) Foreign Application Priority Data

Mar. 5, 2019   (CN) .......................... 201910163063.1

(51) Int. Cl.
*G06F 3/044* (2006.01)

(52) U.S. Cl.
CPC .......... *G06F 3/0446* (2019.05); *G06F 3/0443* (2019.05); *G06F 3/0448* (2019.05); *G06F 2203/04102* (2013.01); *G06F 2203/04111* (2013.01)

(58) Field of Classification Search
None
See application file for complete search history.

(56) References Cited

U.S. PATENT DOCUMENTS

| 2015/0022736 | A1  | 1/2015  | Kim et al. |
| 2015/0253882 | A1* | 9/2015  | Lee ........................ H05K 3/321 345/173 |
| 2017/0199594 | A1  | 7/2017  | Lee et al. |
| 2018/0321709 | A1  | 11/2018 | Kang et al. |

(Continued)

FOREIGN PATENT DOCUMENTS

| CN | 1257135  A  | 6/2000 |
| CN | 106970724 A | 7/2017 |

(Continued)

*Primary Examiner* — Duane N Taylor, Jr.

(57) ABSTRACT

A touch panel is provided. the touch panel includes a substrate, a sensing electrode, and a driving electrode. The sensing electrode and the driving electrode are disposed on the substrate insulated from each other. The sensing electrode includes a plurality of sensing sub-electrodes electrically connected to each other. The driving electrode includes a plurality of driving sub-electrodes electrically connected to each other. A length of each sensing sub-electrode is less than 500 μm. A length of each driving sub-electrode is less than 500 μm.

10 Claims, 7 Drawing Sheets

(56) References Cited

U.S. PATENT DOCUMENTS

2019/0189699 A1    6/2019  Ye
2021/0223916 A1*   7/2021  Zheng ................... G06F 3/0443

FOREIGN PATENT DOCUMENTS

| CN | 108089748 A | 5/2018 |
| CN | 109002205 A | 12/2018 |
| CN | 109508117 A | 3/2019 |
| EP | 2827231 A2 | 1/2015 |

* cited by examiner

TOUCH PANEL

FIELD OF INVENTION

The present disclosure relates to touch panel technologies, and more particularly, to a touch panel.

BACKGROUND OF INVENTION

Figure 1:
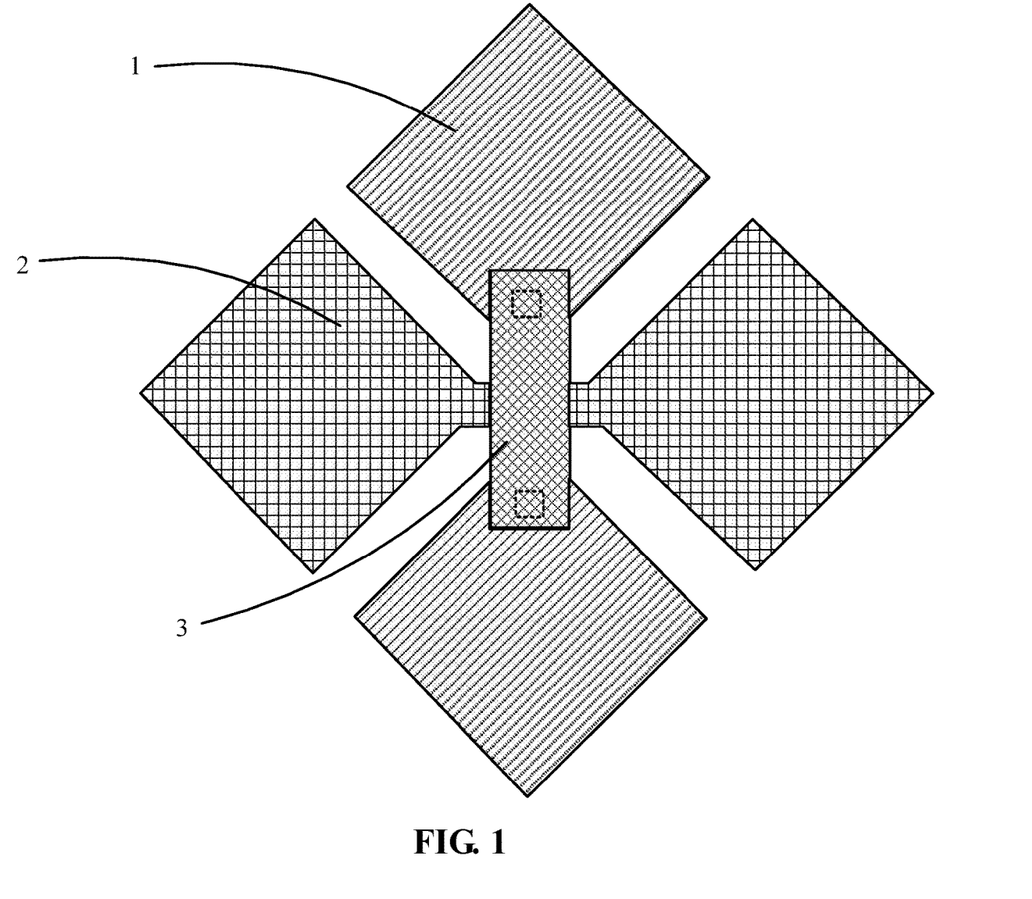
FIG. 1 is a schematic structure of a conventional touch panel.

Emergence of active matrix organic light emitting display (AMOLED) flexible display technologies has enabled large-volume production of fixed-curve surface products. With continuous maturity of technology, foldable flexible display touch technologies have almost done, and practitioners are also accelerating development of collapsible touch technology with flexible displays. At present, the most popular conductive material for touch panels is Indium Tin Oxide (ITO), which is the first one used in touch panel industry due to its good optical and electrical properties. FIG. 1 shows a conventional touch sensing unit including two sensing electrodes 2, two driving electrodes 1 and a bridge structure 3 connecting the two driving electrodes 1.

However, the ITO is essentially an inorganic metal oxide, which has remarkable brittleness. When used as a folding type touch panel, it is easy to cause cracks due to repeated bending, and resulting in failure of touch function.

Therefore, there is a necessity to provide a touch panel to solve the present issue.

SUMMARY OF INVENTION

In view of the above, the present disclosure provides a touch panel to solve aforementioned issues.

In order to achieve above-mentioned object of the present disclosure, one embodiment of the disclosure provides a touch panel includes a substrate, a sensing electrode, and a driving electrode. The sensing electrode and the driving electrode are disposed on the substrate and insulated from each other.

The sensing electrode includes a plurality of sensing sub-electrodes electrically connected to each other.

In one embodiment of the touch panel of the disclosure, the driving electrode includes a plurality of driving sub-electrodes electrically connected to each other.

In one embodiment of the touch panel of the disclosure, a length of each sensing sub-electrode is less than 500 micrometers; and a length of each driving sub-electrode is less than 500 micrometers.

In one embodiment of the touch panel of the disclosure, a shape of each sensing sub-electrode is polygon.

In one embodiment of the touch panel of the disclosure, a shape of each driving sub-electrode is polygon.

In one embodiment of the touch panel of the disclosure, an edge of each sensing sub-electrode parallels an edge of a contour of the sensing electrode, another edge of the sensing sub-electrode parallels another edge of the contour of the sensing electrode, an edge of each driving sub-electrode parallels an edge of a contour of the driving electrode, and another edge of the driving sub-electrode parallels another edge of the contour of the driving electrode.

In one embodiment of the touch panel of the disclosure, the plurality of sensing sub-electrodes and the plurality of driving sub-electrodes are multi-layer structure of indium tin oxide/metal/indium tin oxide.

In one embodiment of the touch panel of the disclosure, a material of the metal in the multi-layer structure of indium tin oxide/metal/indium tin oxide is silver, and a thickness of the metal is less than 80 nanometers.

In one embodiment of the touch panel of the disclosure, the touch panel further includes a plurality of first metallic bridges, wherein each sensing sub-electrode electrically connects with another sensing sub-electrode by the first metallic bridge.

In one embodiment of the touch panel of the disclosure, the touch panel further includes a first insulated layer disposed between the first bridge and the sensing sub-electrode.

In one embodiment of the touch panel of the disclosure, the touch panel further includes a first electrically conductive hole disposed through the insulated layer for electrically connecting the first metallic bridge with the sensing sub-electrode.

In one embodiment of the touch panel of the disclosure, the touch panel further includes a plurality of second metallic bridge, wherein each driving sub-electrode connects with another driving sub-electrode by the second metallic bridge.

In one embodiment of the touch panel of the disclosure, the touch panel further includes a second insulated layer disposed between the second metallic bridge and the driving sub-electrode.

In one embodiment of the touch panel of the disclosure, the touch panel further includes a second electrically conductive hole disposed through the second insulated layer for electrically connecting the second metallic bridge with the driving sub-electrode.

In comparison with the prior art, one embodiment of the disclosure provides the touch panel. The sensing electrode includes a plurality of sensing sub-electrodes electrically connected with each other. The driving electrode includes a plurality of driving sub-electrode electrically connected with each other. Therefore, the embodiments of the present disclosure can effectively prevent from concentration the bending or folding stress at some region, generating cracks on the touch panel, and lengthening the cracks out. Furthermore, the disclosure provides ITO/metal/ITO multi-layer compound structure as a structure of driving sub-electrodes. Hence, the issue of easily cracked ITO materials can be solved.

DETAILED DESCRIPTION OF PREFERRED EMBODIMENTS

The following description of the embodiments is provided by reference to the following drawings and illustrates the specific embodiments of the present disclosure. Directional terms mentioned in the present disclosure, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

In the drawings, similar structural elements are denoted by the same reference numerals.

Figure 2:
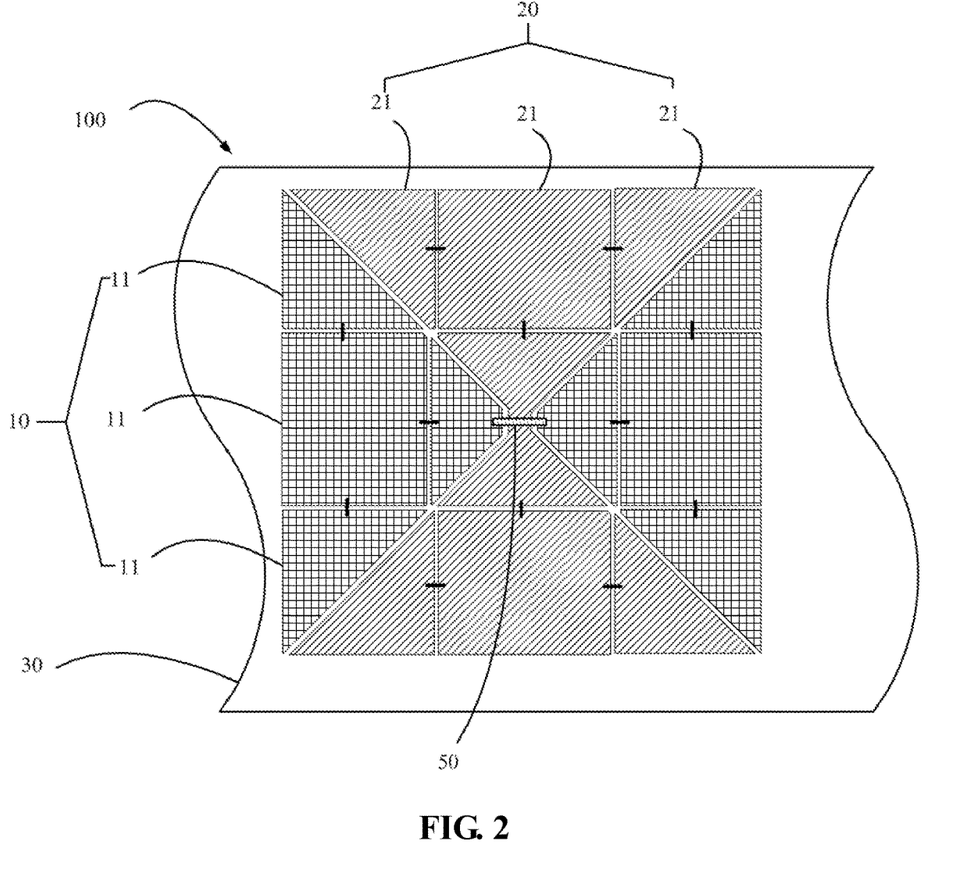
FIG. 2 is a schematic view of a structure of a touch panel according to an embodiment of the present disclosure.

Referring to FIG. 2, the disclosure provides a touch panel 100 including a substrate 30, a sensing electrode 10 and a driving electrode 20. The sensing electrode 10 and the driving electrode 20 are disposed on the substrate 30 and insulated from each other.

The sensing electrode 10 includes a plurality of sensing sub-electrodes 11 electrically connected to each other.

In an embodiment of the disclosure, the driving electrode 20 includes a plurality of driving sub-electrodes 21 electrically connected to each other.

Figure 11:
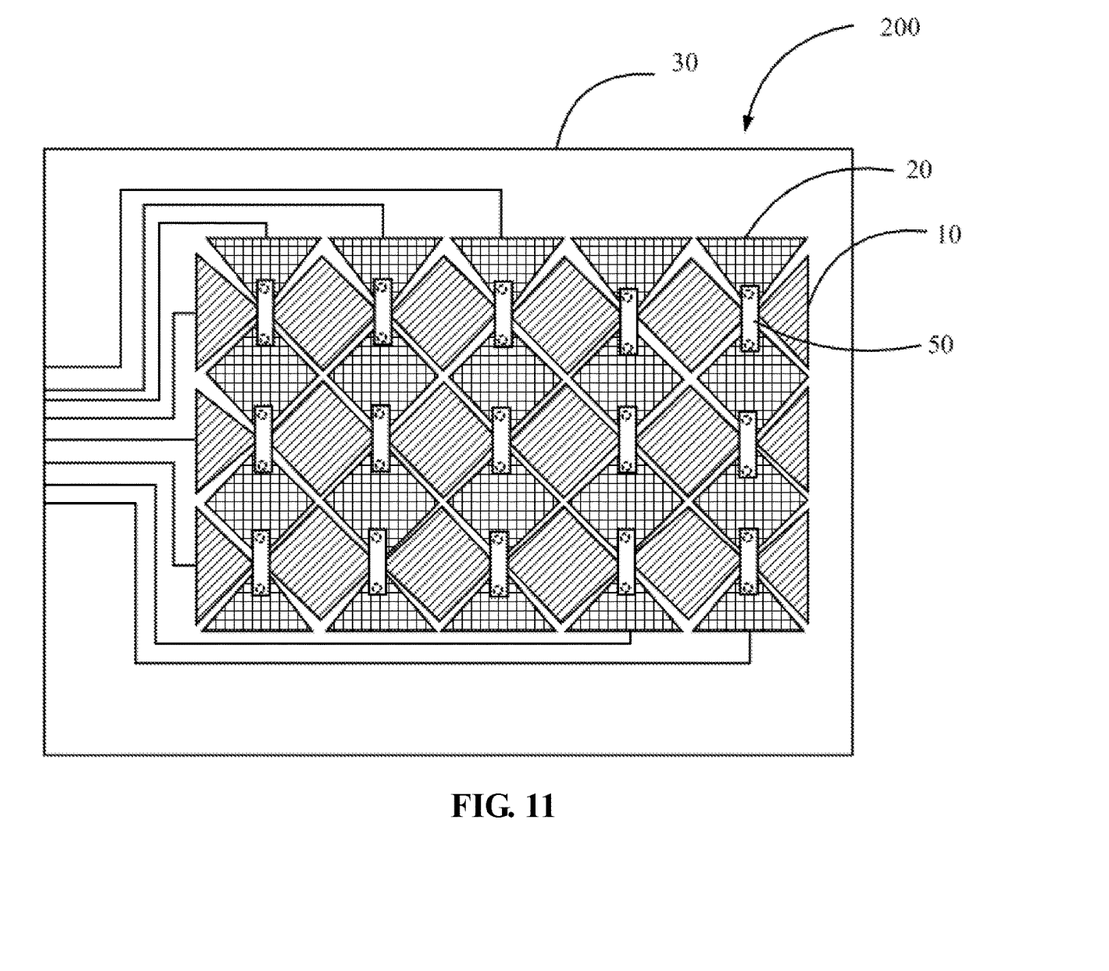
FIG. 11 is a schematic view of a structure of a touch panel according to another embodiment of the present disclosure.

FIG. 2 shows a basic unit of the touch panel 100, which includes two sensing electrodes 10 and one driving electrode 20. The two sensing electrodes 10 are electrically connected to each other by a bridging structure 50. However, the invention is not limited thereto. Referring to FIG. 11, in detail, a plurality of sensing electrodes 10 and a plurality of driving electrodes 20 are configured on the substrate 30 of the touch panel 200. The sensing electrode 10 and the driving electrode 20 are insulated from each other.

In detail, the sensing electrodes 10 are laterally arranged in series and are electrically connected to each other with an electrode material. The driving electrodes 20 are longitudinal arranged in series and are electrically connected to each other by bridging structures 50. The disclosure does not limit types of arrangement or electrical connection of the sensing electrodes 10 or the driving electrodes 20.

In detail, a length of each sensing sub-electrode 11 is less than 500 μm. A length of each driving sub-electrode 21 is less than 500 μm.

In an embodiment of the disclosure, a shape of each sensing sub-electrode 11 is polygon.

In detail, the polygon is, for example, a rectangle or a diamond, and not limited thereto in the disclosure.

In an embodiment of the disclosure, a shape of each driving sub-electrodes 21 is polygon.

In detail, the polygon is, for example, a rectangle or a diamond, and not limited thereto in the disclosure.

Figure 4:
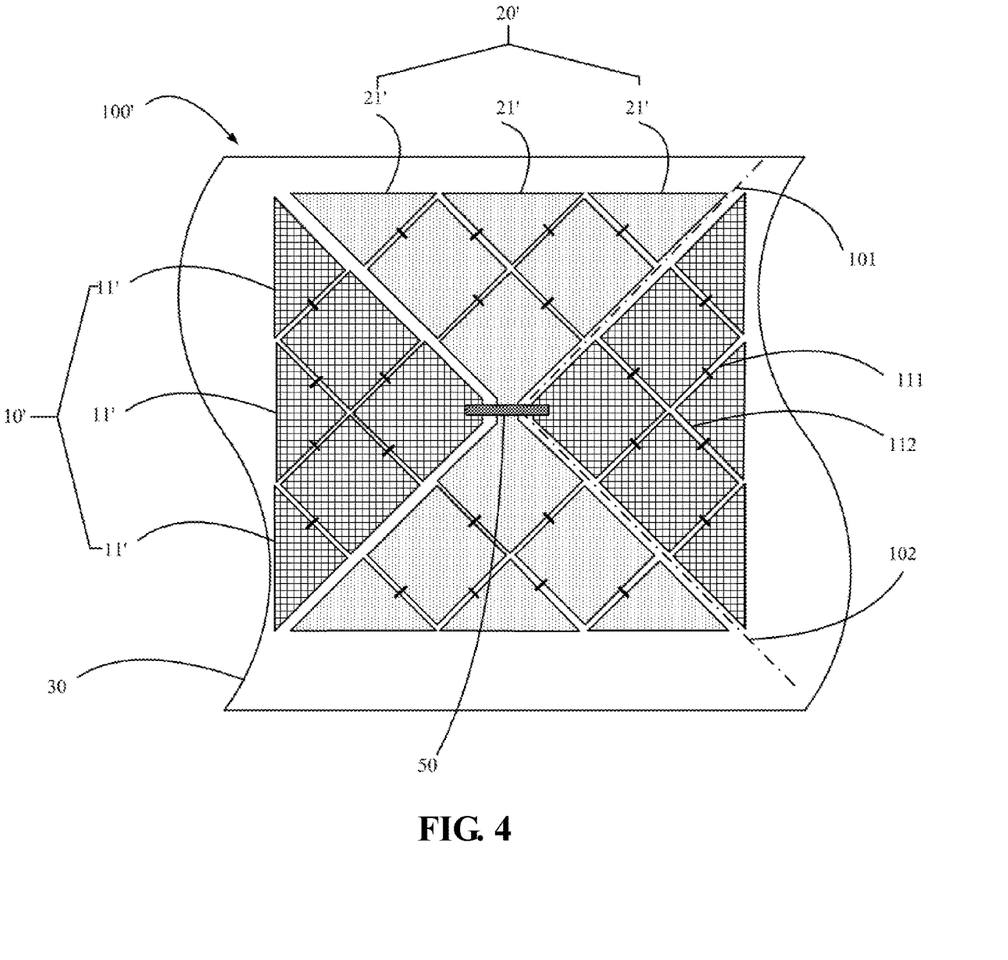
FIG. 4 is a schematic view of a structure of a touch panel according to another embodiment of the present disclosure.

Referring to FIG. 4, in the touch panel 100' of one embodiment of the disclosure, an edge 111 of each sensing sub-electrode 11' parallels an edge 101 of a contour of the sensing electrode_10,' and another edge 112 of the sensing sub-electrode 11' parallels another edge 102 of the contour of the sensing electrode_10.' Similarly, an edge of each driving sub-electrode 21' parallels an edge of a contour of the driving electrode 20,' and another edge of the driving sub-electrode 21' parallels another edge of the contour of the driving electrode_20'.

In detail, in an embodiment of the disclosure, the sub-electrodes adopt a rhombus-shaped arrangement structure, which can optically reduce visibility of ITO gaps, thereby reducing visibility of etching marks and achieving a good optical effect.

Figure 3:
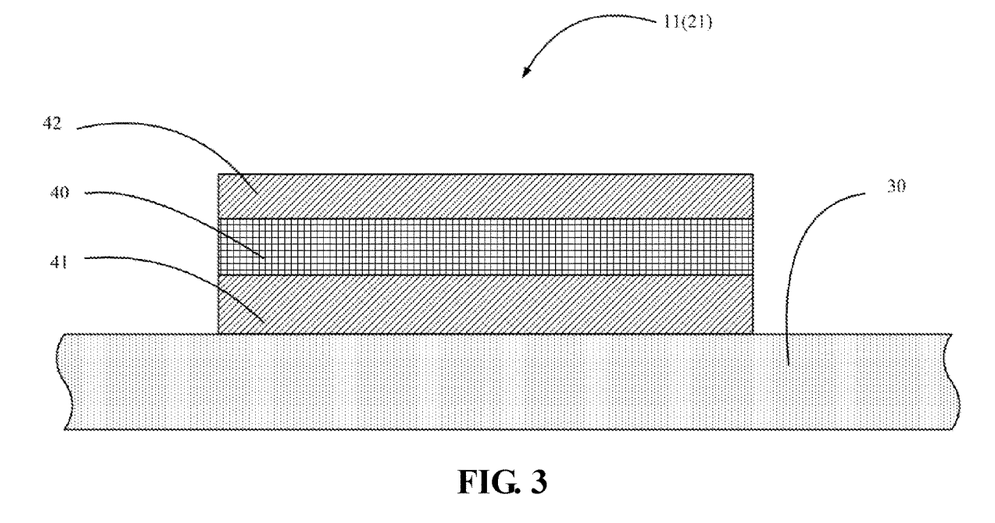
FIG. 3 is a cross-sectional schematic view of an electrode of the touch panel according to an embodiment of the present disclosure.

Referring to FIG. 3, in one embodiment of the disclosure, the plurality of sensing sub-electrodes and the plurality of driving sub-electrodes are multi-layer compound structures of indium tin oxide/metal/indium tin oxide.

In detail, the plurality of sensing sub-electrodes 11 or the plurality of sub-driving electrodes 21 of the disclosure are formed by providing a first indium tin oxide layer 41 on the substrate 30, providing a metal layer 40 on the first indium tin oxide layer 41, and providing a second indium tin oxide layer 42 on the metal layer 40. The metal layer 40 is, for example, silver, gold, etc., and the thickness of the metal layer is less than 80 nm. The issue that ITO materials are brittle or easily cracked is thus solved.

Figure 5:
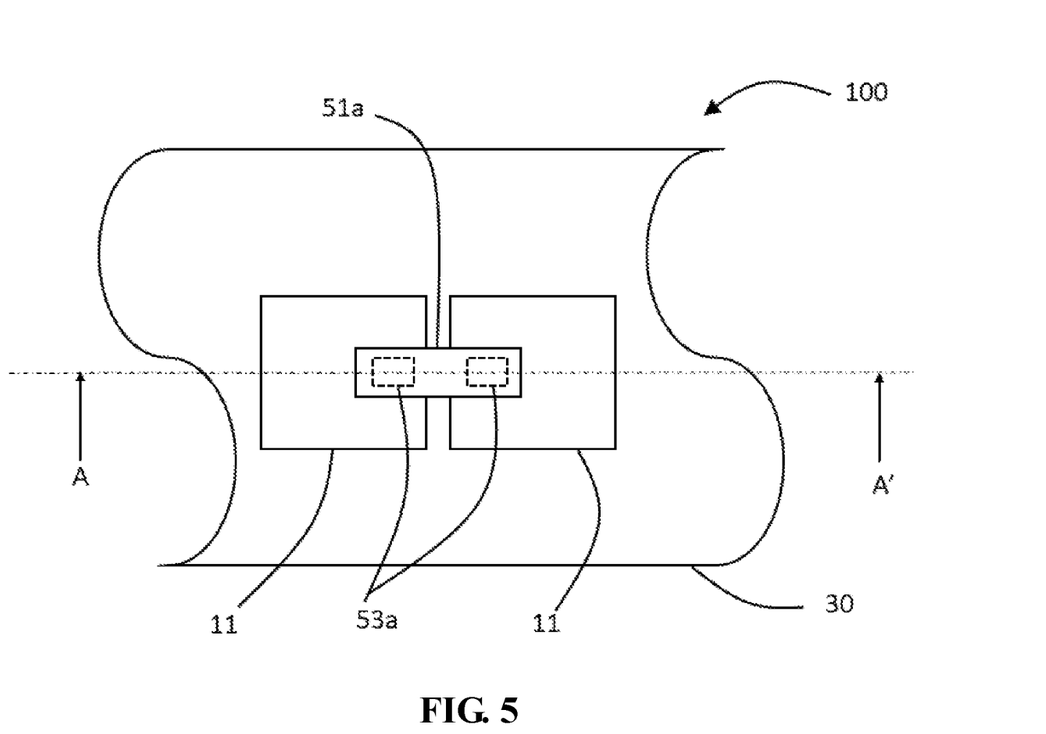
FIG. 5 is a schematic view of a structure of a first metallic bridge of the touch panel according to an embodiment of the present disclosure.

Referring to FIG. 5, in an embodiment of the disclosure, the touch panel 100 further includes a plurality of first metallic bridges 51a. Each of the sensing sub-electrodes 11 is electrically connected to another sensing sub-electrode 11 through the first metallic bridge 51a.

Figure 6:
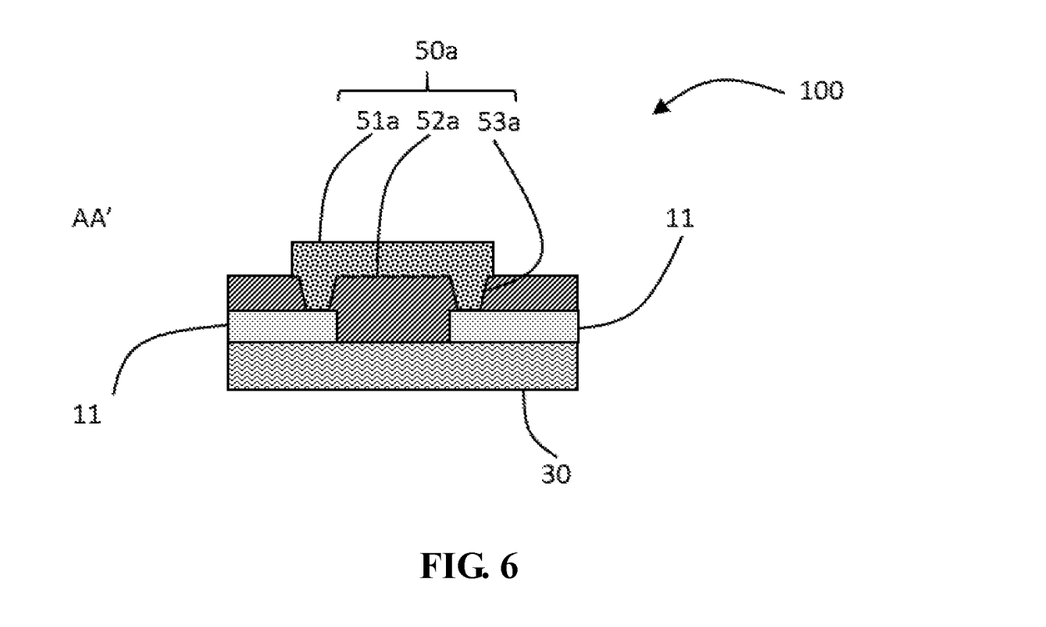
FIG. 6 is a cross-sectional schematic view of FIG. 5 along AA' line.

Referring to FIG. 6, in an embodiment of the disclosure, the touch panel 100 further includes a first insulated layer 52 configured between the first metallic bridge 51a and the sensing sub-electrode 11.

In an embodiment of the present disclosure, the touch panel 100 further includes a first electrically conductive hole 53a disposed through the first insulated layer 52a for electrically connecting the first metallic bridge 51a with the sensing sub-electrode 11.

In detail, electrical connections among the plurality of sensing sub-electrodes 11 may be configured by the material of the sub-electrodes, or by the additionally fabricated bridging structure 50a such as the first metallic bridge 51a.

Figure 7:
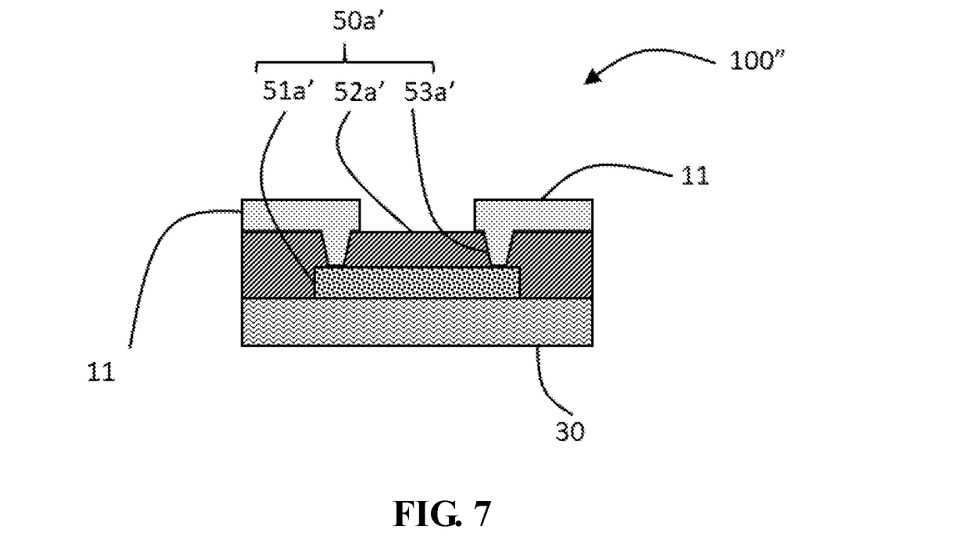
FIG. 7 is a schematic view of a structure of a first metallic bridge of the touch panel according to an embodiment of the present disclosure.

Referring to FIG. 7, in another embodiment of the disclosure, the touch panel 100" further includes a first insulated layer 52a' configured between the first metallic bridge 51a' and the sensing sub-electrode 11.

In detail, the first metallic bridge 51a' is configured on the substrate 30, and the first insulated layer 52a' covers the metallic bridge 51a'. The sensing sub-electrode 11 is disposed on the insulated layer 52a'.

In an embodiment of the disclosure, the touch panel 100" further includes a first conductive hole 53a' disposed through the first insulated layer 52a' for electrically connecting the first metallic bridge 51a' with the sensing sub-electrode 11.

In detail, the first conductive hole 53a or 53a' is filled with a conductive material such as metal or polysilicon.

Figure 8:
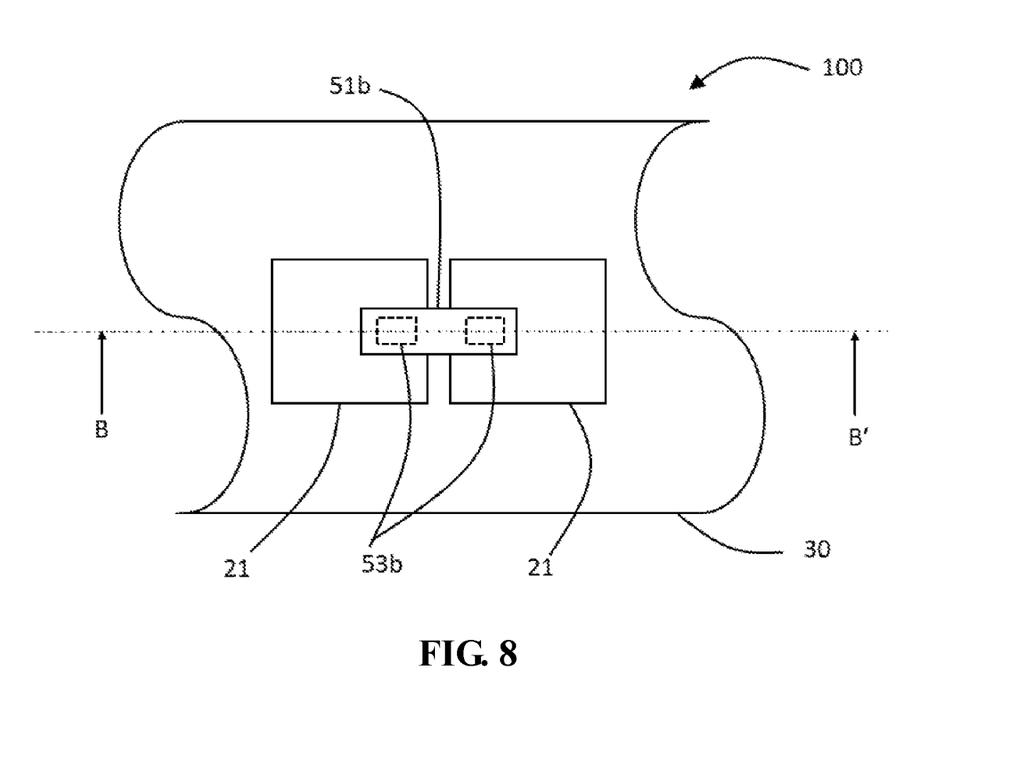
FIG. 8 is a schematic view of a structure of a second metallic bridge of the touch panel according to an embodiment of the present disclosure.

Referring to FIG. 8, in an embodiment of the disclosure, the touch panel 100 further includes a plurality of second metallic bridges 51b, wherein each of the driving sub-electrodes 21 is electrically connected to another driving sub-electrode 21 through the second metallic bridge 51b.

Figure 9:
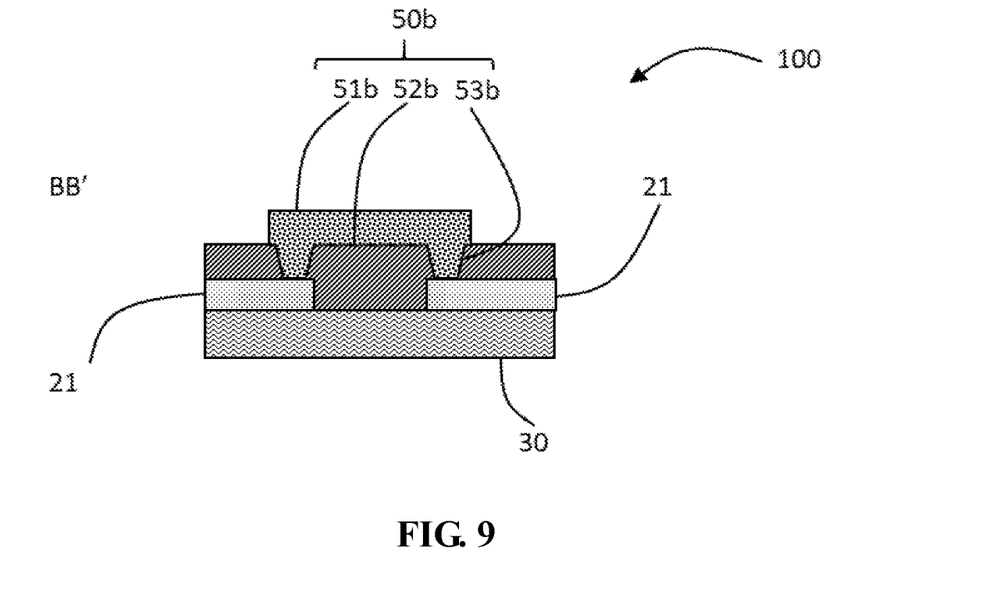
FIG. 9 is a cross-sectional schematic view of FIG. 8 along BB' line.

Referring to FIG. 9, in an embodiment of the disclosure, the touch panel 100 further includes a second insulated layer 52b configured between the second metallic bridge 51b and the driving sub-electrode 21.

In an embodiment of the disclosure, the touch panel 100 further includes a second conductive hole 53b disposed through the second insulated layer 52*b* for electrically connecting the second metallic bridge 51*b* with the driving sub-electrode 21.

In detail, electrical connections among the plurality of sub-driving electrodes 21 may be configured by the materials of the sub-electrodes, or by the additionally fabricated bridging structure 50*b* such as the second metallic bridge 51*b*.

Figure 10:
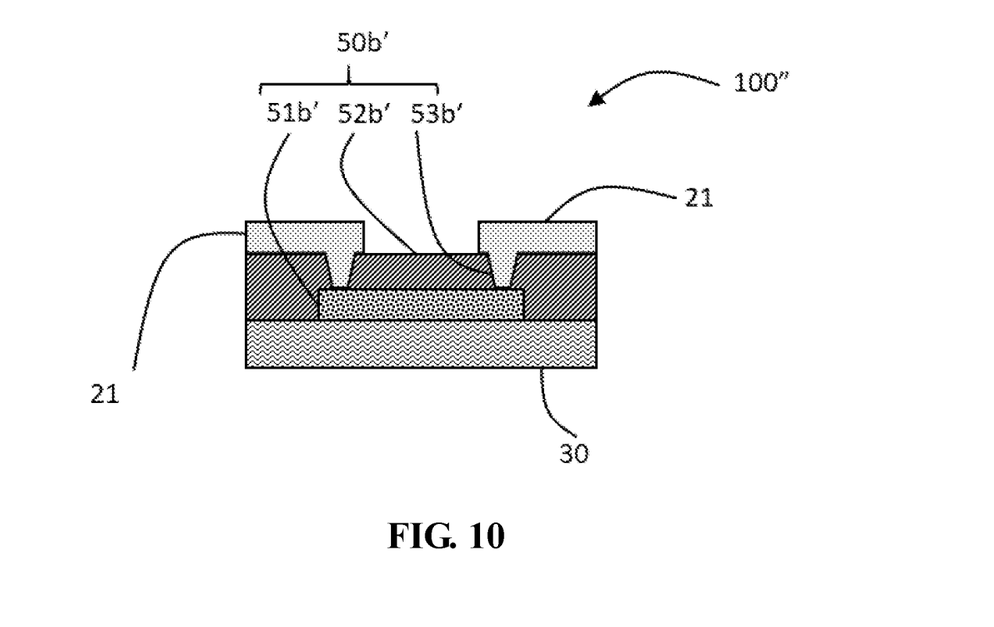
FIG. 10 is a schematic view of a structure of a second metallic bridge of the touch panel according to an embodiment of the present disclosure.

Referring to FIG. 10, in another embodiment of the disclosure, the touch panel 100" further includes a second insulated layer 52*b*' configured between the second metallic bridge 51*b*' and the driving sub-electrode 21.

In detail, the second metallic bridge 51*b*' is configured on the substrate 30, and the second insulated layer 52*b*' covers the second metallic bridge 51*b*'. The driving sub-electrode 21 is configured on the second insulated layer 52*b*'.

In an embodiment of the disclosure, the touch panel 100" further includes a second conductive hole 53*b*' disposed through the second insulated layer 52*b*' for electrically connecting the second metallic bridge 51*b*' with the driving sub-electrode 21.

In detail, the second conductive hole 53*b* or 53*b*' is filled with a conductive material such as metal or polysilicon.

In comparison with the prior art, one embodiment of the disclosure provides the touch panel. The sensing electrode includes a plurality of sensing sub-electrodes electrically connected with each other. The driving electrode includes a plurality of driving sub-electrode electrically connected with each other. Therefore, the embodiments of the present disclosure can effectively prevent from concentration the bending or folding stress at some region, generating cracks on the touch panel, and lengthening the cracks out. Furthermore, the disclosure provides ITO/metal/ITO multi-layer compound structure as a structure of driving sub-electrodes. Hence, the issue of easily cracked ITO materials can be solved.

The present disclosure has been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A touch panel, comprising:
   a substrate, a plurality of sensing electrodes, and a plurality of driving electrodes, wherein the sensing electrodes and the driving electrodes are disposed on the substrate and insulated from each other, and each sensing electrode comprises a plurality of sensing sub-electrodes electrically connected to each other;
   each driving electrode comprises a plurality of driving sub-electrodes electrically connected to each other;
   a length of each sensing sub-electrode is less than 500 micrometers;
   a length of each driving sub-electrode is less than 500 micrometers; and
   wherein both the sensing sub-electrodes and the driving sub-electrodes are arranged in a triangular shape and a rectangular shape, both the sensing electrodes and the driving electrodes are arranged in a triangular shape, and the sensing electrodes and the driving electrodes are arranged to form a rectangle.

2. The touch panel according to claim 1, wherein an edge of each sensing sub-electrode parallels an edge of a contour of the sensing electrode, another edge of the sensing sub-electrode parallels another edge of the contour of the sensing electrode, an edge of each driving sub-electrode parallels an edge of a contour of the driving electrode, and another edge of the driving sub-electrode parallels another edge of the contour of the driving electrode.

3. The touch panel according to claim 1, further comprising a plurality of first metallic bridges, wherein each sensing sub-electrode electrically connects with another sensing sub-electrode by the first metallic bridge.

4. The touch panel according to claim 3, further comprising a first insulated layer disposed between the first metallic bridge and the sensing sub-electrode.

5. The touch panel according to claim 4, further comprising a first electrically conductive hole disposed through the first insulated layer for electrically connecting the first metallic bridge with the sensing sub-electrode.

6. The touch panel according to claim 1, further comprising a plurality of second metallic bridge, wherein each driving sub-electrode connects with another driving sub-electrode by the second metallic bridge.

7. The touch panel according to claim 6, further comprising a second insulated layer disposed between the second metallic bridge and the driving sub-electrode.

8. The touch panel according to claim 7, further comprising a second electrically conductive hole disposed through the second insulated layer for electrically connecting the second metallic bridge with the driving sub-electrode.

9. A touch panel, comprising a substrate, a plurality of sensing electrodes, a plurality of driving electrodes, a plurality of first metallic bridges, and a plurality of second metallic bridges, wherein the sensing electrodes, the driving electrodes, and the plurality of first metallic bridges are disposed on the substrate, and the plurality of second metallic bridges are disposed above the substrate;
   the sensing electrodes and the driving electrodes are insulated from each other;
   each sensing electrode comprises a plurality of sensing sub-electrodes electrically connected to each other by the plurality of first metallic bridges;
   each driving electrode comprises a plurality of driving sub-electrodes electrically connected to each other by the plurality of second metallic bridges;
   a length of each sensing sub-electrode is less than 500 micrometers;
   a length of each driving sub-electrode is less than 500 micrometers; and
   wherein both the sensing sub-electrodes and the driving sub-electrodes are arranged in a triangular shape and a rectangular shape, both the sensing electrodes and the driving electrodes are arranged in a triangular shape, and the sensing electrodes and the driving electrodes are arranged to form a rectangle.

10. The touch panel according to claim 9, wherein an edge of each sensing sub-electrode parallels an edge of a contour of the sensing electrode, another edge of the sensing sub-electrode parallels another edge of the contour of the sensing electrode, an edge of each driving sub-electrode parallels an edge of a contour of the driving electrode, and another edge of the driving sub-electrode parallels another edge of the contour of the driving electrode.

* * * * *